(12) United States Patent
Carmeli et al.

(10) Patent No.: US 10,678,821 B2
(45) Date of Patent: Jun. 9, 2020

(54) EVALUATING THESES USING TREE STRUCTURES

(71) Applicant: International Business Machines Corporation, Armonk, NY (US)

(72) Inventors: Boaz Carmeli, Koranit (IL); Einat Kermany, Manof (IL); Ofer Lavi, Tel-Aviv (IL); Guy Lev, Tel Aviv (IL); Elad Mezuman, Hod Hsharon (IL)

(73) Assignee: International Business Machines Corporation, Armonk, NY (US)

( * ) Notice: Subject to any disclaimer, the term of this patent is extended or adjusted under 35 U.S.C. 154(b) by 354 days.

(21) Appl. No.: 15/614,632

(22) Filed: Jun. 6, 2017

(65) Prior Publication Data
US 2018/0349476 A1     Dec. 6, 2018

(51) Int. Cl.
| G06F 16/33 | (2019.01) |
| G06F 16/41 | (2019.01) |
| G06F 16/951 | (2019.01) |
| G06F 16/9537 | (2019.01) |
| G06F 16/34 | (2019.01) |
| G06F 16/9535 | (2019.01) |

(52) U.S. Cl.
CPC ........ G06F 16/3334 (2019.01); G06F 16/345 (2019.01); G06F 16/41 (2019.01); G06F 16/951 (2019.01); G06F 16/9537 (2019.01); G06F 16/9535 (2019.01)

(58) Field of Classification Search
CPC ... G06F 16/3334; G06F 16/9537; G06F 16/41
See application file for complete search history.

(56) References Cited

U.S. PATENT DOCUMENTS

| 8,082,208 B2 | 12/2011 | Gavin | |
| 2005/0131818 A1 | 6/2005 | Desal et al. | |
| 2006/0287909 A1 | 12/2006 | McBride | |
| 2009/0019083 A1 | 1/2009 | Bacon | |
| 2010/0070457 A1* | 3/2010 | Kejariwal | G06N 5/003 706/59 |
| 2016/0232465 A1 | 8/2016 | Kurtz et al. | |
| 2017/0061377 A1* | 3/2017 | Hwang | G06Q 10/10 |
| 2017/0140240 A1* | 5/2017 | Socher | G06N 3/0445 |
| 2017/0371956 A1* | 12/2017 | Allen | G06F 16/313 |

OTHER PUBLICATIONS

Ahammada, Mohammad Faisal Ahammada et al.; "The Pre-Acquisition Evaluation of Target Firms and Cross Border Acquisition Performance"; vol. 22, Issue 5, Oct. 2013, pp. 894-904. http://www.sciencedirect.com/science/article/pii/S0969593113000024.

* cited by examiner

Primary Examiner — Loc Tran
(74) Attorney, Agent, or Firm — Barry Blount

(57) ABSTRACT

An example system includes a processor to receive a plurality of object aspects of an object to be evaluated using a process, a structure of the process, a plurality of extracted facts from documents, a tree related to the plurality of object aspects and the structure, and a thesis for each leaf in the tree. The processor is also to relate the extracted facts to the theses in the tree. The processor is to generate a score for each leaf corresponding to a fact in the tree. The processor is to generate a thesis score and a thesis summary for each thesis based on the scores and the summaries of related facts for each thesis. The processor is to further generate a final score for the object based on the thesis scores.

17 Claims, 11 Drawing Sheets

400

EVALUATING THESES USING TREE STRUCTURES

BACKGROUND

The present techniques relate to thesis evaluation. More specifically, the techniques relate to analysis of theses using tree structures.

SUMMARY

According to an embodiment described herein, a system can include a processor to receive a plurality of object aspects of an object to be evaluated using a process, a structure of the process, a plurality of extracted facts from documents, a tree related to the plurality of object aspects and the structure, and a thesis for each leaf in the tree. The processor can further also relate the extracted facts to the theses in the tree. The processor can also generate a score and a summary for each leaf corresponding to a fact in the tree. The processor can further generate a thesis score and a thesis summary for each thesis based on the scores and the summaries of related facts for each thesis. The processor can also further generate a final score for the object based on the thesis scores.

According to another embodiment described herein, a method can include receiving, via a processor, a plurality of object aspects of an object to be evaluated using a process, a structure of the process, a plurality of extracted facts from documents, a tree related to the plurality of object aspects and the structure, and a thesis for each leaf in the tree. The method can include relating, via the processor, the extracted facts to the theses in the tree. The method can further include generating, via the processor, a score and a summary for each leaf corresponding to a fact in the tree. The method can also further include generating, via the processor, a thesis score and a thesis summary for each thesis based on the scores and the summaries of related facts for each thesis. The method can further include generating, via the processor, a final score for the object based on the thesis scores.

According to another embodiment described herein, a computer program product for analyzing theses can include computer-readable storage medium having program code embodied therewith. The computer readable storage medium is not a transitory signal per se. The program code is executable by a processor to cause the processor to receive a plurality of object aspects of an object to be evaluated using a process, a structure of the process, a plurality of extracted facts from documents, a tree related to the plurality of object aspects and the structure, and a thesis for each leaf in the tree. The program code can also cause the processor to relate the extracted facts to the theses in the tree. The program code can also cause the processor to also further generate a score and a summary for each leaf corresponding to a fact in the tree. The program code can also cause the processor to generate a thesis score and a thesis summary for each thesis based on the scores and the summaries of the related facts for each thesis. The program code can also cause the processor to further generate a final score for the object based on the thesis scores.

DETAILED DESCRIPTION

Figure 1:
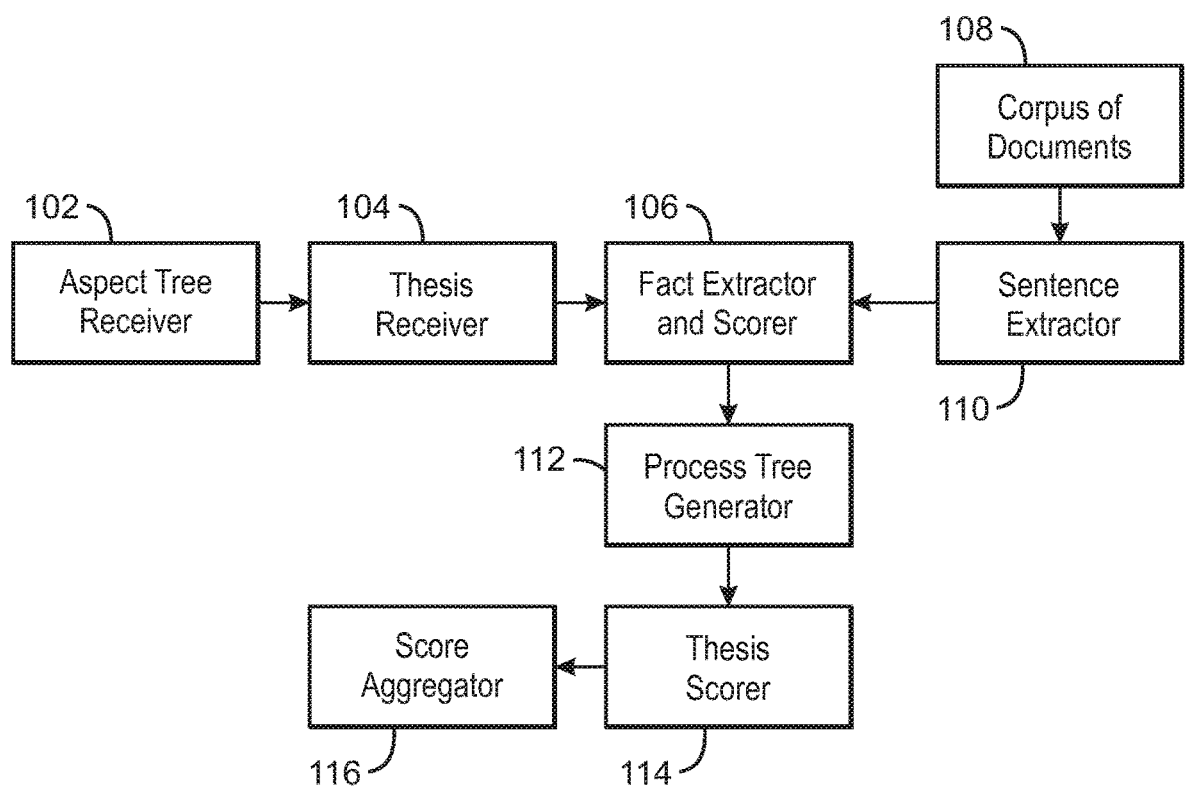
FIG. 1 is a block diagram of an example system that can evaluate theses using a tree structure.

Some processes may include the collection of information from a variety of documents and an analysis of such documents to support or reject a thesis. In some examples, the processes may have well-defined structures that may be used to evaluate different theses. For example, such a process may include a due diligence process used to evaluate a company or other assets for various purposes. As used herein, due diligence refers to a well-defined process of appraisal of an object to evaluate its value or potential value. Such processes may assist potential buyers or investors decide whether to buy or invest in a company or asset.

However, well-defined processes such as due diligence may be labor intensive and may also take a long time to complete. Moreover, manual collection and evaluation of such documents may miss an important sentence and thus lead to inaccurate results.

According to embodiments of the present techniques a processor may evaluate theses using a tree structure. The processor may receive a root thesis, a plurality of process structures, a plurality of extracted facts from documents, a tree related to the plurality of object aspects and the structure, and a thesis for each leaf in the tree. For example, the process structures may be due diligence structures. The processor may then relate the extracted facts to the theses in the tree. For example, the processor may add the facts as new leaves that are children of the thesis nodes in the tree. The processor may then generate a score for each leaf corresponding to a fact in the tree. The processor may then aggregate the scores of facts relating to each thesis to generate a thesis score for each thesis. The processor may then generate and display a root thesis score based on the thesis scores. Thus, the present techniques may receive theses supporting or contradicting a root thesis and evaluate the theses using extracted facts from a plurality of documents. The present techniques may be able to efficiently and accurately evaluate root theses. For example, the techniques described herein may be used in deciding whether to buy a company or invest in a stock. Thus, the techniques may enable improved data analysis.

In some scenarios, the techniques described herein may be implemented in a cloud computing environment. As discussed in more detail below in reference to at least FIGS.

8, 9, and 10, a computing device configured to evaluate theses may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

FIG. 1 is a block diagram of an example system that can evaluate theses using a tree structure. The system is generally referred to using the reference number 100 and can be implemented at least in part using the computing device 800 of FIG. 8 below.

The example system 100 includes an aspect tree generator, a thesis receiver 104, a fact extractor and scorer 106, a corpus of documents 108, a sentence extractor 110, a process tree generator 112, a thesis scorer 114, and a score aggregator 116. In some examples, thesis scorer 114 and the score aggregator 116 may be trained neural networks.

As shown in FIG. 1, a system 100 can receive theses and score the theses based on automatically extracted facts from a corpus of documents 108. For example, an aspect tree receiver 102 may receive a tree of aspects related to a subject of a process. For example, the subject may be a company subject to a due diligence process. In some examples, a list of received aspects of the company may be organized into a tree structure. For example, the aspects of a company may include information, products, customer information, competition, marketing, sales and distribution, research and development, management and personnel, and legal matters, among other aspects.

The thesis receiver 104 may then receive one or more theses for each of the aspects. For example, the theses may be short statements or predictions related to the object. In some examples, the thesis receiver 104 may receive adjustment or adaptations of the theses for a specific object to be evaluated. For example, a user may adjust or adapt theses based on a specific object to be evaluated by the system 100.

For example, thesis adaptation may be performed using a company's specific product name, etc.

The fact extractor and scorer 106 may then receive a corpus of documents 108 and extract and score facts from sentences received from the sentence extractor 110. As used herein, a fact is a piece of information that either supports or contests the correctness of a given thesis. For example, the sentence extractor 110 may receive a corpus of documents 108 related to an object to be evaluated. The extractor and scorer 110 may then extract sentences from the corpus of documents 108. For example, the sentence extractor 110 may split documents into sentences. In some examples, the sentence extractor 110 may include an information retrieval (IR) process that finds and retrieves relevant documents for each thesis. The sentence extractor 110 may then split each document into sentences. In some examples, the fact extractor and scorer 106 may then compute a relatedness score indicating a level of relatedness between a sentence and a thesis. For example, the fact extractor and scorer 106 may compute a relatedness score for each sentence and each thesis combination. In some examples, the fact extractor and scorer 106 can compute the relatedness score using a classification algorithm. For example, the classification algorithm may be a logistic regression algorithm. In some examples, the features in the classification algorithm may measure similarity between concepts in a given thesis and concepts in a sentence. For example, each sentence may be a potential fact. In some examples, sentences that are scored higher than a predefine threshold may then be selected by the fact extractor and scorer 106 as facts. In some examples, the fact extractor and scorer 106 may also calculate the polarity of each related sentence with respect to the thesis. For example, a polarity may be a support or a contest of a thesis. In some examples, the polarity may be calculated using another classification algorithm that predicts the polarity of each fact regarding the thesis.

In some examples, a process tree generator 112 may generate a process tree that incorporates the theses and facts into one tree. For example, the process tree may be a due diligence process tree that includes one or more due diligence process structures.

The thesis scorer 114 may then generate a thesis score for each of the theses. For example, the thesis scorer 114 can aggregate the scores of all the facts related to a given thesis into a single thesis score. In some examples, the thesis score can be a binary score. For example, the thesis score may indicate a yes or no prediction as to the correctness of each thesis. The thesis scorer 114 can calculate a thesis score using any of a variety of different algorithms. In some examples, the thesis scorer 114 may calculate the mean of the fact scores of the related facts for each thesis. For example, supporting facts may have positive values, while contesting facts may have negative values. In some examples, the thesis scorer 114 may also generate a summary for each of the theses. For example, the summary may include short sentences that are descriptive of each thesis.

The score aggregator 116 may then generate a final score based on the thesis scores. For example, the final score may be generated by aggregating the thesis scores. In some examples, the score aggregator 116 recursively calculate thesis scores for each level of the tree based on the thesis scores of child theses. In some examples, the final score may be a score for a root thesis. For example, the root thesis may be supported or contested by the correctness of the other theses. In some examples, the score aggregator 116 can generate a final score by calculating a mean of the thesis scores. In some examples, the score aggregator 116 may alternatively be a trained classification model that can predict the final score. For example, the score aggregator 116 may be a neural network trained to output confidence scores for each thesis and node in the tree. Such an output of confidence scores may be more informative than just an output of a final score. In some examples, the score aggregator 116 may be trained using a flat input. For example, the tree structure may not be used for input, and the input to the classification model may instead be a vector of all theses' scores. In some examples, the flat input classification model may be trained using logistic regression. In some examples, the flat input classification model may be trained using support vector machines (SVMs). For example, given a set of training examples, each training sample marked as belonging to one or the other of two categories, an SVM training algorithm may build an SVM classification model that assigns new examples to one category or the other. An SVM model is a representation of the examples as points in space, mapped so that the examples of the separate categories are divided by a gap that is as wide as possible. New examples may then be mapped into that same space and predicted to belong to a category based on which side of the gap they fall. In either such linear models, the weight vector may have an informative value for understanding the importance of each of the theses. In some examples, the score aggregator 116 can normalize scores to keep the weights in the same scale. For example, the score aggregator 116 can normalize scores to mean of 0 and standard deviation of 1. In the flat input model, the theses may be prepared in advance, and may not be dynamically prepared per company as the input vector is not flexible.

In some examples, the score aggregator 116 may be a trained neural tree classification model. For example, the classification model may be a neural network whose structure is defined by the tree. In some examples, preserving the tree structure may yield an additional informative benefit because the importance or weight of a sub-tree in a certain layer of the network can be inferred. For example, a sub-tree may represent a sub-aspect. A sub-aspect may be an aspect that is more specific than its parent aspect. For example, "pending lawsuits against the company" is a sub-aspect of "legal and related matters." In some examples, the neural tree classification model may enable an analyst to understand the importance of an aspect with reference to other aspects. For example, a neural tree classification model may enable an analyst to understand the importance of "products" in light of "competition," referring to example aspects from FIG. 2 below. As mentioned above, in some examples, normalization of scores may also be used in this model to keep the weights in the same scale. For example, a batch-normalization method can be applied for each layer in the neural network. Another advantage of the neural network model is the ability to handle dynamic theses which are created per company. For example, handling of per-company input can be done using recursive neural network. In some examples, text vector representations of the theses can be used as additional input to the model. For example, the model may be trained to use these text representations in order to merge the scores of several theses into a single score of a parent node. In this way, scores can be further merged up the tree, by using the vector representation of the textual description of the sub-aspect corresponding to each node in the tree, until a final score is output for a root thesis, or parent node of all other nodes. For example, after the score aggregator 116 is trained, the final score may be output based on documents available at the time.

In some examples, the score aggregator 116 may also be trained for regression. For example, the score aggregator 116 may be trained to predict a numeric score using a regression loss function.

In some examples, the score aggregator 116 may use attention. As used herein, attention refers to a focus on subsets of an input. For example, given a set of inputs, attention may be used to focus on a particular subset of inputs by assigning weights to each one of the inputs. In one example, a trained neural network may be based on the tree as described above. However, the theses may be leaves of the tree. Each thesis may have a defined score. For example, the defined score for each thesis may be the mean score obtained from each fact. In some examples, each thesis may be represented by a vector using a sentence representation. Then, for each node which is a parent of some theses, a single score is derived from the scores of its children theses. For example, each such parent node may have a vector of trainable parameters. In some examples, the vector can be used for attention. For example, the dot product of this vector with a thesis' vector can be used to determine the thesis' weight. In some examples, the node's score may be the weighted sum of the theses' scores. The use of attention may provide better explanatory properties. For example, by observing the weights given to the theses may indicate which theses were considered by the model to be more important.

In another example of a model using attention, attention may be used at all layers. For example, the neural network may also be based on the tree, however the facts may be represented as the leaves (i.e. each thesis is a parent of some facts). For example, each fact may have a score for the validity of the thesis. In some examples, each node may be represented as a vector, rather than a scalar as in the example above. In some examples, a representation of a fact in each leaf may be the sentence vector representation multiplied by its score. In some examples, a vector representation of a non-leaf node may be the weighted sum of the representations of its children. For example, the weights may be obtained using attention. In some examples, a softmax function for a final score or prediction may be placed above the root node of the tree. For example, the softmax function may be used to convert a K-dimensional vector z of arbitrary real values to a D-dimensional vector σ(z) of real values in the range (0,1) that add up to 1. In some examples, a fully-connected layer may be placed above the root node of the tree if regression is to be used. Thus, this second example using attention at all layers may have a better explanatory property. Rather than a neural network with constant weights, the model may include dynamic weights obtained as a function of the facts. In some examples, the model may be a classification model or a regression model.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional documents, tree structures, scoring methods, etc.).

Figure 2:
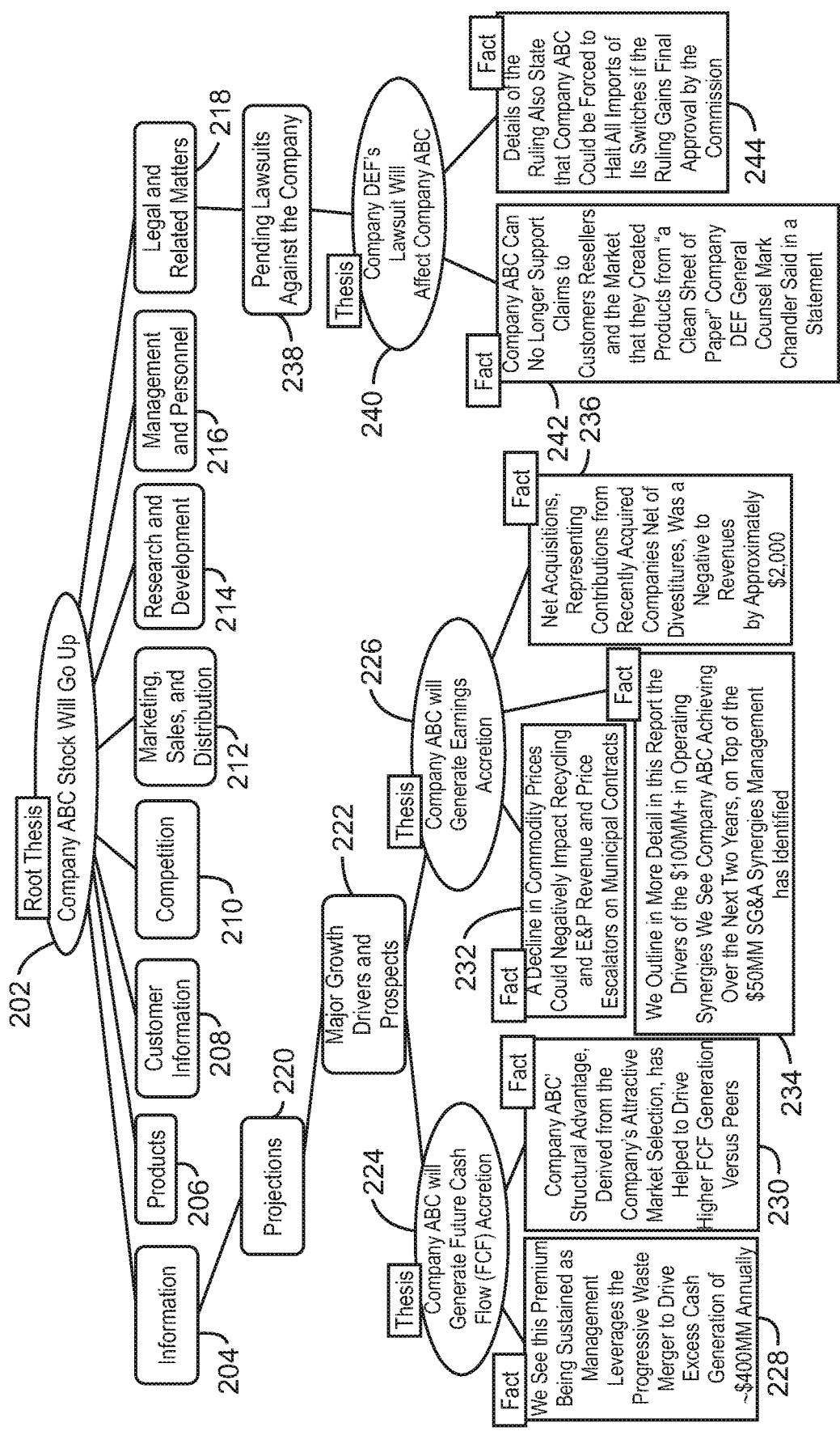
FIG. 2 is a block diagram of an example tree structure including received theses.

FIG. 2 is an information flow diagram of an example tree structure including received theses. The tree structure 200 can be generated using any suitable computing device, such as the computing device 800 of FIG. 8.

As shown in FIG. 2, an example tree structure 200 includes a root thesis 202, and a plurality of aspects 204, 206, 208, 210, 212, 214, 216, 218, 220, and 222. The tree structure 200 also include theses 224, 226 corresponding to aspect 222. The theses 224 and 226 are associated with corresponding facts 228 and 230, and 232, 234, and 236, respectively. The tree structure also includes aspect 238 and associated thesis 240, with associated facts 242 and 244.

In some examples, the root thesis 202 may be supported or contradicted by the aspects 204-218. For example, given aspects 204-218 and a process structure such as a due diligence process structure, a system may receive a root thesis 202 that can be supported or contradicted by the aspects. In some examples, the root thesis 202 may be received from or modified by a user. For example, an analyst may want to know whether a stock is likely to go up or whether a current worth of a company exceeds a specified amount. The system may also receive theses 224, 226, and 240. In some examples, one or more theses may be received for each of the aspects 204-222. As shown in FIG. 2, for the aspect 222, the system has received a thesis 224 and a thesis 226. For each of these theses 224 and 226, the system may then assign related facts that either support or contradict the theses. For example, the facts may be sentences with relatedness scores above a particular threshold score. For thesis 224, the fact 228 may support the thesis 224. In some examples, a polarity for the fact 228 may thus be a positive polarity and be assigned a positive score. Likewise, the fact 230 may also support thesis 224. Therefore, fact 230 may also be assigned a positive polarity and scored accordingly. By contrast, the fact 236 may contradict the thesis 226. Therefore, in some examples, fact 236 may be assigned a negative polarity and scored accordingly.

It is to be understood that the block diagram of FIG. 2 is not intended to indicate that the tree structure 200 is to include all of the components shown in FIG. 2. Rather, the tree structure 200 can include fewer or additional components not illustrated in FIG. 2 (e.g., additional root theses, theses, facts, etc.).

Figure 3:
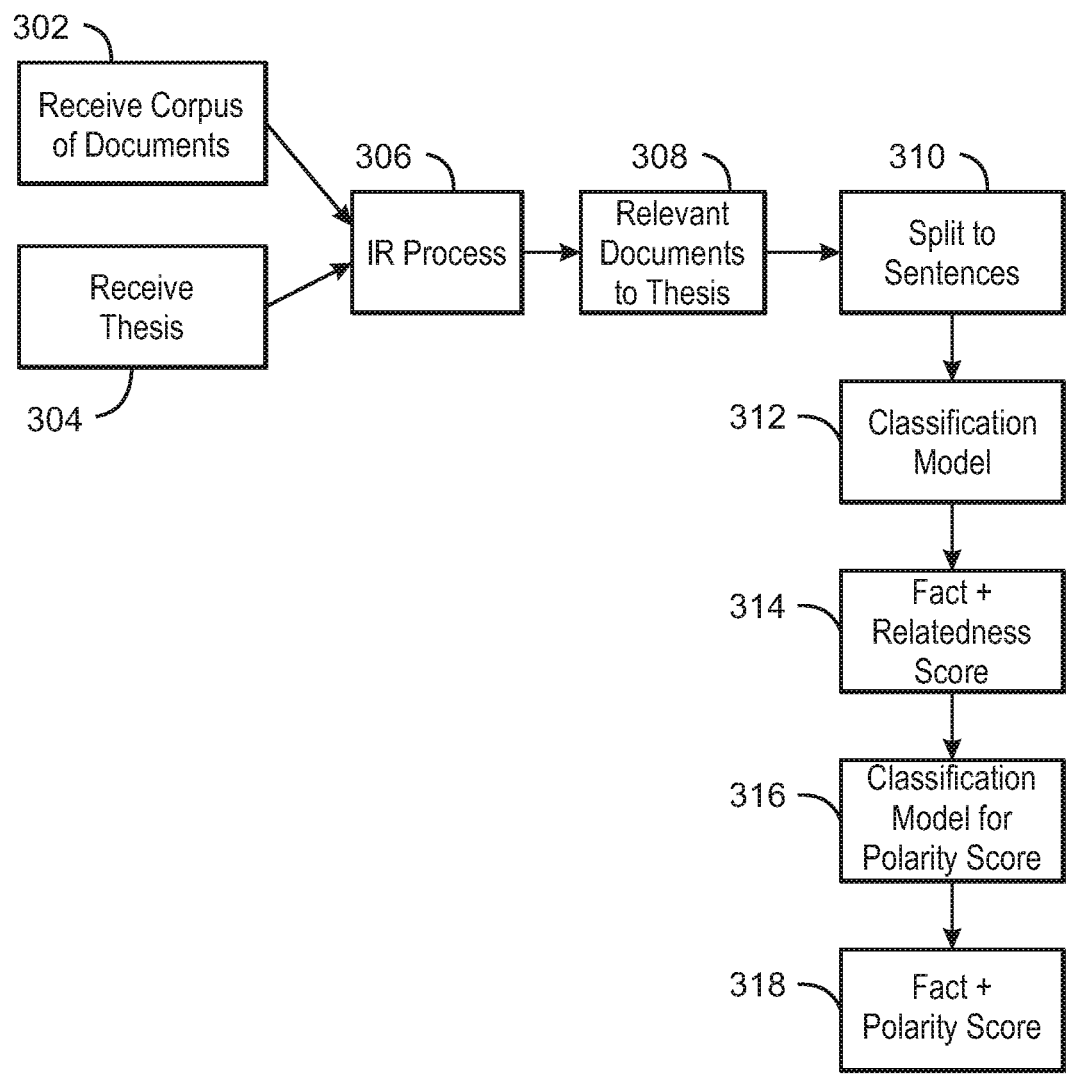
FIG. 3 is a is a process flow diagram of an example method for extracting and scoring facts from documents.

FIG. 3 is a process flow diagram of an example method for extracting and scoring facts from documents. The method 300 can be implemented with any suitable computing device, such as the computing device 800 of FIG. 8. For example, the method can be implemented via the processor 802 of computing device 800.

At block 302, a processor receives a corpus of documents. For example, the corpus of documents may be a collection of documents numbering in the hundreds, thousands, or millions of documents. In some examples, the documents may be of a particular type of documents such as financial documents.

At block 304, the processor receives a thesis. For example, the thesis may include a premise that can be supported or contradicted using facts. In some examples, the thesis may be categorized into an aspect. In some examples, the thesis may have been modified or received from a user. In some examples, any number of theses may be received.

At block 306, the processor performs an information retrieval (IR) process. For example, the processor may search for and retrieve relevant documents 308 for each received thesis.

At block 310, the processor splits each document into sentences. In some examples, the sentences may represent potential facts that may support or contradict the thesis 304. For example, the sentences can be scored and parsed for facts as described in block 312. Thus, facts may be extracted from the documents and sent to the classification module for training.

At block 312, the processor may train a classification model to output facts and corresponding scores 314. For example, the scores may be relatedness scores between each fact and each received thesis 304. In some examples, the relatedness score may be calculated using logistic regression. For example, the features of the classification model may measure similarity between concepts in each thesis and concepts in each fact. For example, the concepts may be acquisitions, balance sheets, cash flow, etc.

At block 316, the processor can train a classification model to output a polarity score 318 for each fact. For example, the polarity score may indicate whether a fact supports or contradicts a thesis. In some examples, a polarity score may be calculated for each related fact of a thesis.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

Figure 4:
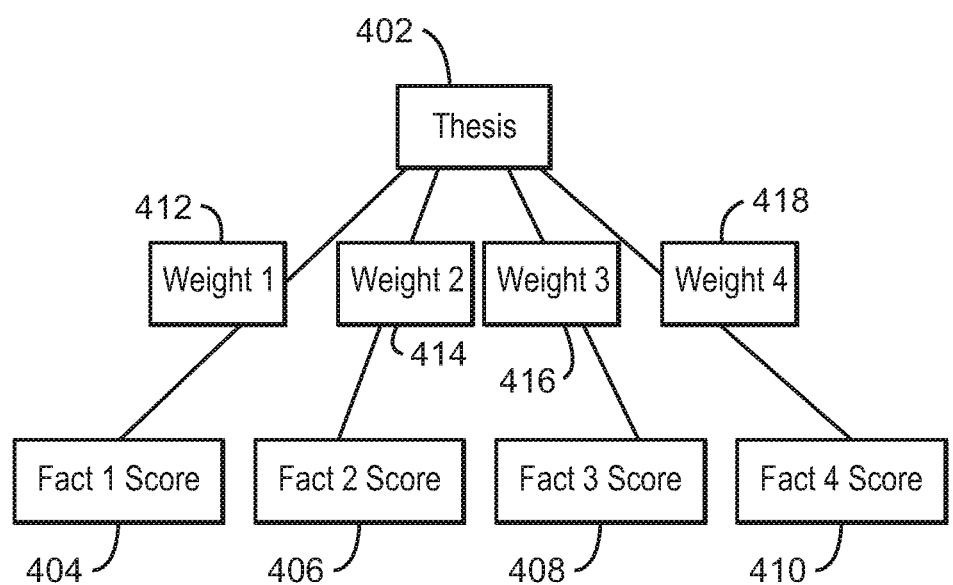
FIG. 4 is a block diagram of an example system for scoring a thesis based on weighted fact scores.

FIG. 4 is a block diagram of an example system for scoring a thesis based on weighted fact scores. The system is generally referred to using the reference number 400 and can be implemented at least in part using the computing device 800 of FIG. 8 below.

The example system 400 includes a thesis 402, and four scored facts 404, 406, 408, and 410. The system 400 further includes weights 412, 414, 416, and 418 associated with scored facts 404, 406, 408, and 410, respectively. For example, the weights may be parameters that are defined during a training process.

As shown in FIG. 4, four facts may have been scored using some algorithm. For example, the facts may be scored with a polarity score that indicates whether each fact supports or contradicts the thesis 402. In some examples, supporting facts may have positive values and contradicting facts may have negative values. The fact scores may then be used to generate a thesis score for the thesis 402. For example, the thesis node in the tree may be a neuron or parent node. In some examples, a parent node may be given a value $V_{parent}$ calculated using the equation:

$$V_{Parent} = \sum_i w_i x_i \qquad \text{Eq. 1}$$

where $w_i$ is a weight for a particular child of the parent and $x_i$ is the value of the particular child. For example, the value may be a fact score. In some examples, an equal weight may be provided to the scores. For example, the thesis score may be generated based on the simple mean of the facts scores. In some examples, the weights parameter may be learned by a back-propagation algorithm. In some examples, a final score may then be obtained by a forward process from the leaves to the root. For example, other thesis scores may be similarly weighted and combined to generate a final score using Eq. 1 above. The system 400 is thus suitable for cases in which the theses are fixed. For example, such a system 400 may not be suitable for dynamically generated theses, which are discussed with respect to methods 500 and 600 of FIGS. 5 and 6 below.

It is to be understood that the block diagram of FIG. 4 is not intended to indicate that the system 400 is to include all of the components shown in FIG. 4. Rather, the system 400 can include fewer or additional components not illustrated in FIG. 4 (e.g., additional documents, tree structures, scoring methods, etc.).

Figure 5:
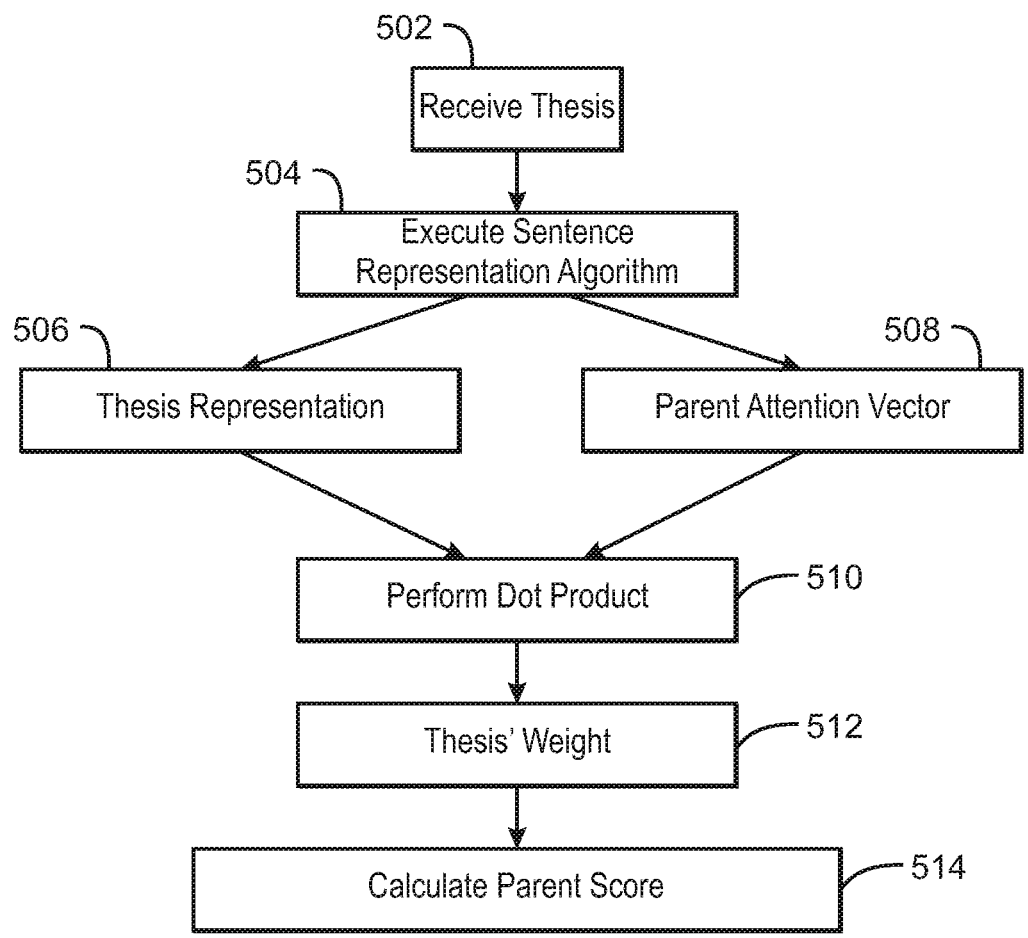
FIG. 5 is a process flow diagram of an example method for scoring a parent node using a parent attention vector.

FIG. 5 is a process flow diagram of an example method for scoring a parent node using a parent attention vector. The method 500 can be implemented with any suitable computing device, such as the computing device 800 of FIG. 8. For example, the method can be implemented via the processor 802 of computing device 800. In some examples, the system 500 may be used to generate parent scores for parent nodes of dynamically generated theses.

At block 502, a processor receives a thesis. For example, a different thesis may be received for each object to be evaluated. In some examples, the same thesis may be used to evaluate different objects. For example, the objects to be evaluated may be companies. In some examples, the thesis may be one of a plurality of theses supporting or contradicting a parent or root thesis. For example, a root thesis may be whether a company's stock will rise in value.

At block 504, the processor executes a sentence representation algorithm. For example, the sentence representation algorithm may generate a vector representation of the thesis, referred to herein as a thesis representation 506. For example, the sentence representation algorithm may use the Continuous Bag-of-Words (CBOW) model, Encoder-Decoder, Fisher Vectors, or Skip-Thought Vectors, among other models. For example, the CBOW model may use the mean of word2vec, or any other pre-trained word embedding, vectors of the words in a sentence. In some examples, the sentence representation algorithm may process the words of the sentence using the long short-term memory (LSTM) recurrent neural network (RNN) architecture, and use the last hidden state as the vector representation of the sentence. In this case, the sentence representation unit will be part of the main model, and its parameters will be trained during the training of the main model.

At block 508, the processor receives a parent attention vector. As used herein, a parent attention vector refers to is a vector of weights which may be learned by backpropagation during model training. In some examples, a node in the tree that is a parent of theses will have one attention vector which will be used for all the theses. In some examples, the parent attention vector values may be binary. Thus, a subset of the thesis representation 506 may be given attention and thus processed based on the parent attention vector. In some examples, the thesis representation 506 may be a vector of values. For example, an example vector may be [0.2, 0.4, −0.1, 0.3, . . . , −0.8, −0.75, 0.8].

At block 510, the processor calculates a dot product of the thesis representation 506 and the parent attention vector 508. For example, each of the values in the thesis representation 506 vector may be multiplied by a corresponding value in the parent attention vector 508 and the results summed together. The result of the dot product may be the thesis weight 512.

At block 514, the processor calculates a parent score based on the thesis score and the thesis weight. For example, the parent score $S_{Parent}$ may be calculated using the equation:

$$S_{Parent} = \Sigma \text{thesis\_score}_i * \text{thesis\_weight}_i \qquad \text{Eq. 2}$$

where $\text{thesis\_score}_i$ is the thesis score for each thesis connected to the parent and $\text{thesis\_weight}_i$ may be the thesis weight associated with each thesis. In some examples, parent scores may thus be generated until a final score is generated. Thus, method 400 may be suitable for calculating a final score for dynamically generated theses.

The process flow diagram of FIG. 5 is not intended to indicate that the operations of the method 500 are to be executed in any particular order, or that all of the operations of the method 500 are to be included in every case. Additionally, the method 500 can include any suitable number of additional operations.

Figure 6:
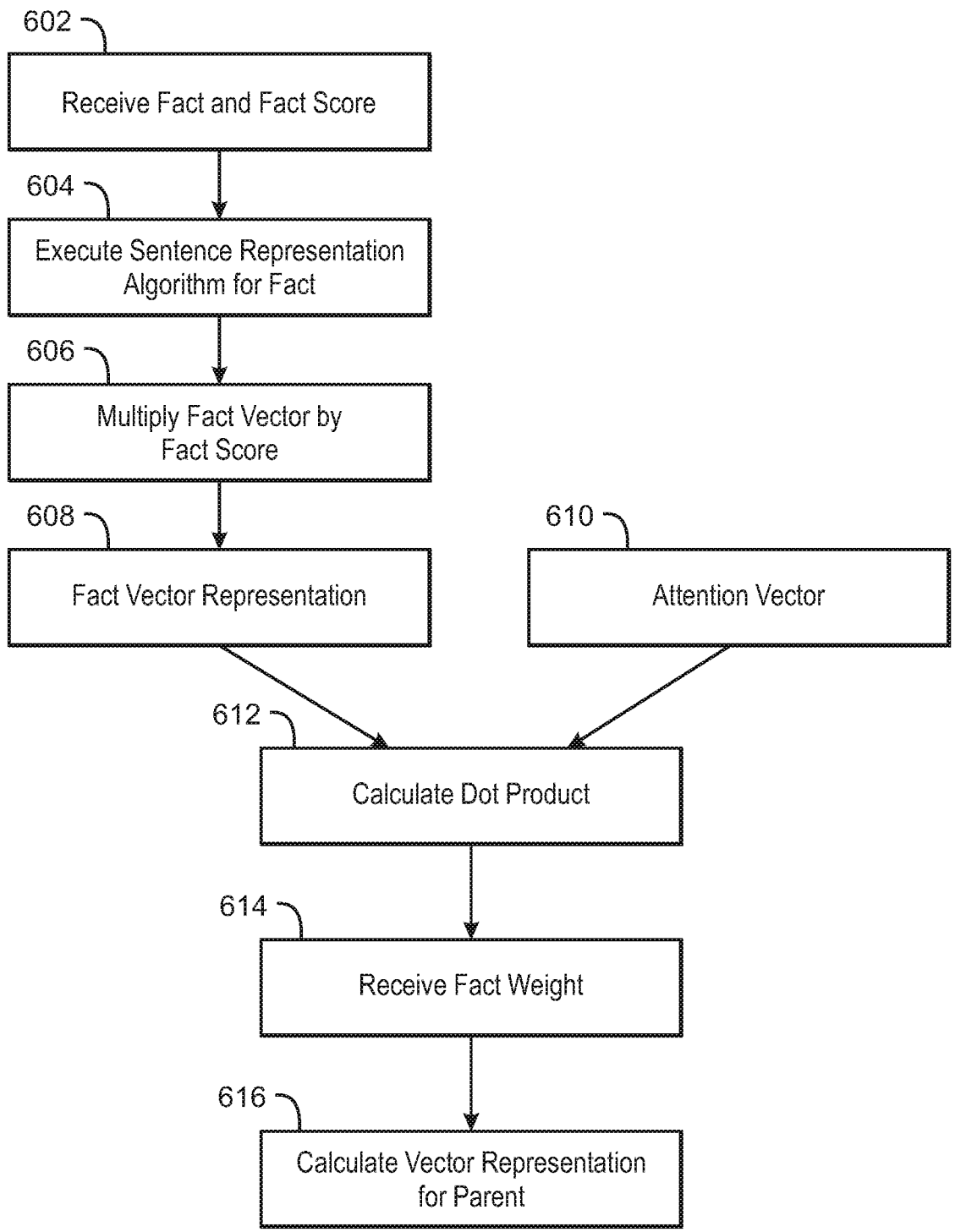
FIG. 6 process flow diagram of an example method for calculating a vector representation for a parent node.

FIG. 6 is a process flow diagram of an example method for calculating a vector representation for a parent node. The method 600 can be implemented with any suitable computing device, such as the computing device 800 of FIG. 8. For example, the method can be implemented via the processor 802 of computing device 800. In some examples, the system 500 may be used to generate parent scores for parent nodes of dynamically generated theses. In the example of FIG. 6, the processor calculates a vector representation for each parent node rather than a scalar score as in the method 500 above.

At block 602, a processor receives a fact and a fact score. For example, the fact may have been retrieved by a suitable information retrieval process. In some examples, the fact score may be any value with a polarity. For example, a negative number may represent that a fact contradicts a thesis, while a positive number may represent that a fact supports a thesis.

At block 604, the processor executes a sentence representation algorithm for the fact. In some examples, the sentence representation algorithm may generate a fact vector representation.

At block 606, the processor multiplies the fact vector by the fact score. The result of the multiplication may be a fact vector representation 608.

At block 610, the processor receives an attention vector. For example, the attention may be associated with the parent node and may include weights to be applied to fact representations.

At block 612, the processor calculates a dot product of the fact vector representation 608 and the attention vector 610. For example, the dot product may be a sum of the products of each of the elements of the fact vector representation 608 and each of the corresponding elements in the attention vector 610. In some examples, the result of the dot product of the fact vector representation 608 and the attention vector 610 may be a fact weight 614. For example, the fact weight 614 may be a scalar value.

At block 614, the processor receives a fact weight. For example, the fact weight may be based on the attention vector.

At block 616, the processor calculates a vector representation for the parent. For example, the parent representation may be generated by calculating the weighted sum of the fact vectors associated with the parent representation using the equation:

$$\text{parent\_representation} = \Sigma_i \text{fact\_vector\_representation\_}{*}\text{fact\_weight\_}i \quad \text{Eq. 3}$$

where the fact_vector_representation_i may be the fact representation 608 for each fact associated with a parent, and the fact_weight_i may be the weight calculated for each fact. For example, the fact weight may have been calculated at block 614 above. For example, the weight for the fact may be calculated based on the dot product of the fact vector representation and the attention vector.

The process flow diagram of FIG. 6 is not intended to indicate that the operations of the method 600 are to be executed in any particular order, or that all of the operations of the method 600 are to be included in every case. Additionally, the method 600 can include any suitable number of additional operations.

Figure 7:
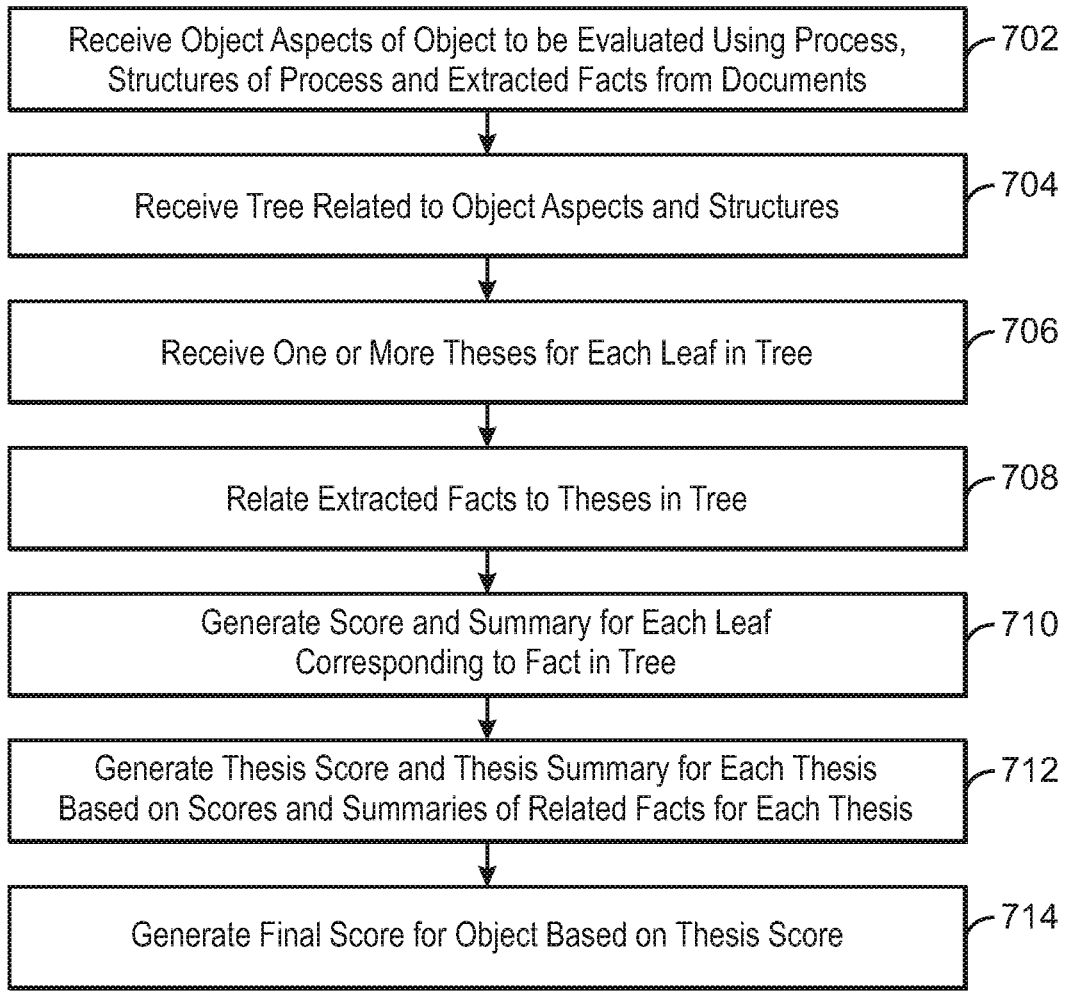
FIG. 7 is a process flow diagram of an example method that can evaluate a root thesis based on generated theses using a tree structure.

FIG. 7 is a process flow diagram of an example method that can evaluate a root thesis based on generated theses using a tree structure. The method 700 can be implemented with any suitable computing device, such as the computing device 800 of FIG. 8. For example, the method can be implemented via the processor 802 of computing device 800.

At block 702, a processor receives a plurality of object aspects of an object to be evaluated using a process, a structure of the process, and extracted facts from documents. In some examples, the object may be a company or an investment. In some examples, the process may be a due diligence process. For example, the company may correspond to a potential stock purchase or a potential acquisition. Thus, a due diligence process may be automatically performed on the company by the processor in order to provide the user a recommendation as to whether to purchase the stock or company. In some examples, the facts may have been extracted from a plurality of documents using any suitable extraction technique. In some examples, extracted facts may be related to one or more aspects of the company. For example, the aspects may include general information about the company, about the company's product, about customers, competition, etc. In some examples, a number of documents may have been split into sentences, a relatedness score calculated for each sentence to each thesis, and sentences extracted having a relatedness score exceeding a threshold score as facts for each thesis.

At block 704, the processor receives a tree based on the plurality of object aspects and the structure. For example, the aspects may be aspects of an object such as a company.

At block 706, the processor receives one or more theses for each leaf in the tree. For example, the theses may be leaves in the tree. In some examples, the theses can be modified or received from a user. In some examples, the theses may be a predefined list of theses. In some examples, the theses may include base theses and complex theses. As used herein, a complex thesis is connected to at least one child thesis. For example, the base theses may correspond to leaves in the tree. The complex theses may correspond to internal nodes of the tree.

At block 708, the processor relates the extracted facts to the theses in the tree. For example, the extracted facts may be related to the theses in the tree based on relatedness scores calculated for each fact. As described at block 706, before involving the facts, the theses may be the leaves of the tree. When facts are extracted and related to theses, the theses may no longer be leaves. For example, each thesis may become a parent of one or more facts. Thus, the facts may now be the leaves of the tree.

At block 710, the processor generates a score and summary for each leaf corresponding to a fact in the tree. For example, the score may include a polarity. In some examples, a negative polarity may indicate a fact contradicts a thesis. In some examples, a positive polarity may indicate a fact supports a thesis. In some examples, the processor can calculate a polarity for each of the related facts of each of the theses. In some examples, the summary may a short explanatory summary of relevant facts for each thesis.

At block 712, the processor generates a thesis score and a thesis summary for each thesis based on the scores and summaries of related facts for each thesis. In some examples, the thesis score may be a scalar score. For example, the processor may generate the thesis score using trained weights for each of the facts. For example, the thesis score may be generated using the system 400 above or method 500 above. In some examples, the thesis score may be a vector representation. For example, the processor may generate the thesis score based on a fact representation. For example, the thesis score may be generated using the method 600 above. In some examples, the processor may generate thesis score and thesis summary for each thesis based on the thesis scores and thesis summaries of child theses connected to each thesis. The processor may thus recursively generate thesis scores and thesis summaries up through the tree beginning at leaves of the tree.

At block 714, the processor generates a final score for the object based on the thesis scores. For example, the final score may be generated using any of the techniques of block 712. In some examples, the processor can train a neural network to classify the thesis scores to generate the final score and a confidence score for each of the theses. In some examples, the processor can calculate a weight for a thesis based on a dot product of an attention vector and a thesis representation. In some examples, the final score can be used to automatically generate a recommendation. For example, the recommendation may be to buy a stock or company. In some examples, the final score can be used to automatically place an order to buy an object, such as a stock in a company. In some examples, a final summary may also be generated based on the thesis summaries.

The process flow diagram of FIG. 7 is not intended to indicate that the operations of the method 700 are to be executed in any particular order, or that all of the operations of the method 700 are to be included in every case. Additionally, the method 700 can include any suitable number of additional operations.

Figure 8:
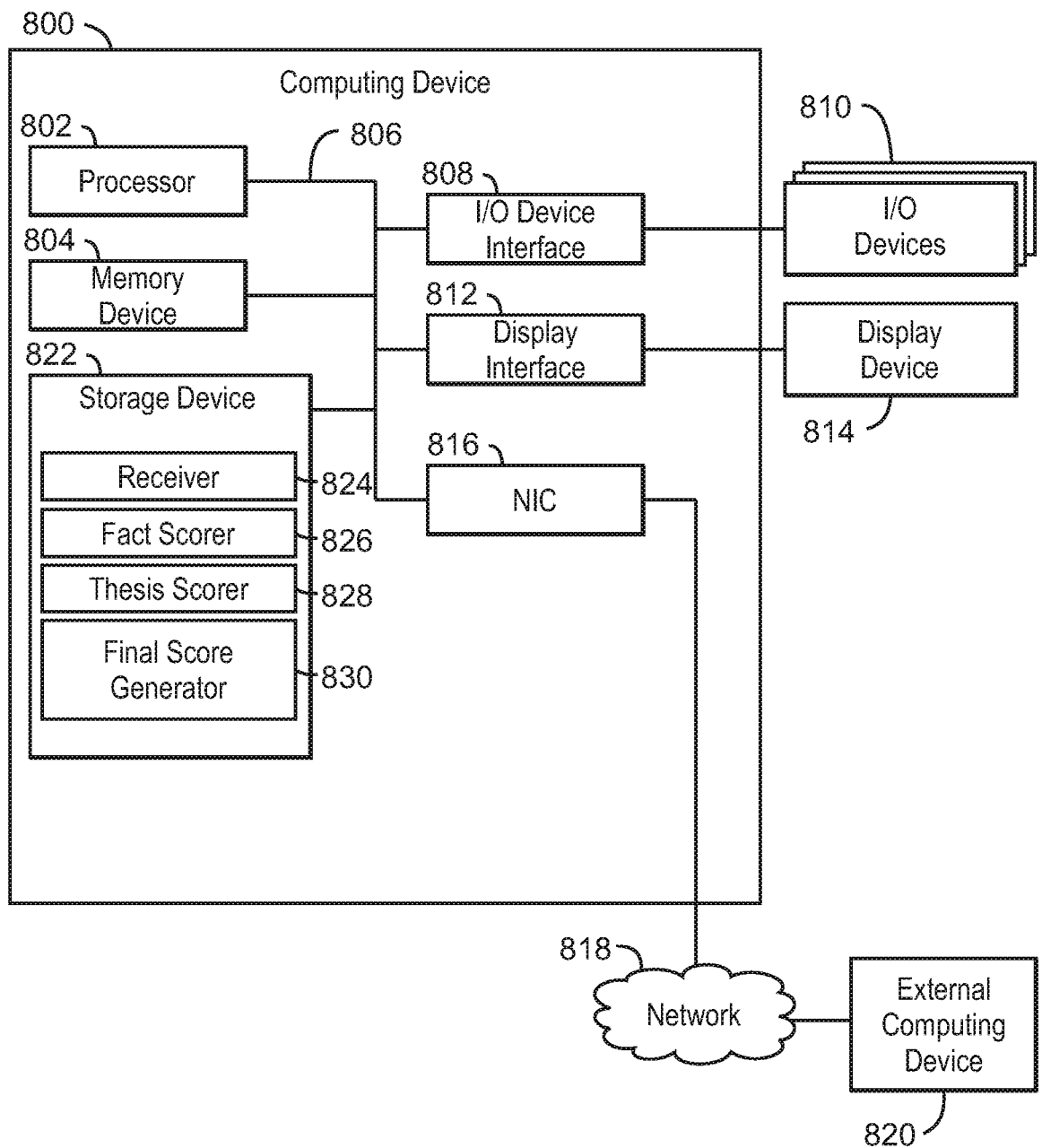
FIG. 8 is a block diagram of an example computing device that can evaluate theses using a tree structure.

With reference now to FIG. 8, an example computing device can evaluate theses using a tree structure. The computing device 800 may be for example, a server, a network device, desktop computer, laptop computer, tablet computer, or smartphone. In some examples, computing device 800 may be a cloud computing node. Computing device 800 may be described in the general context of computer system executable instructions, such as program modules, being executed by a computer system. Generally, program modules may include routines, programs, objects, components, logic, data structures, and so on that perform particular tasks or implement particular abstract data types. Computing device 800 may be practiced in distributed cloud computing environments where tasks are performed by remote processing devices that are linked through a communications network. In a distributed cloud computing environment, program modules may be located in both local and remote computer system storage media including memory storage devices.

The computing device 800 may include a processor 802 that is to execute stored instructions, a memory device 804 to provide temporary memory space for operations of said instructions during operation. The processor can be a single-core processor, multi-core processor, computing cluster, or any number of other configurations. The memory 804 can include random access memory (RAM), read only memory, flash memory, or any other suitable memory systems.

The processor 802 may be connected through a system interconnect 806 (e.g., PCI®, PCI-Express®, etc.) to an input/output (I/O) device interface 808 adapted to connect the computing device 800 to one or more I/O devices 810. The I/O devices 810 may include, for example, a keyboard and a pointing device, wherein the pointing device may include a touchpad or a touchscreen, among others. The I/O devices 810 may be built-in components of the computing device 800, or may be devices that are externally connected to the computing device 800.

The processor 802 may also be linked through the system interconnect 806 to a display interface 812 adapted to connect the computing device 800 to a display device 814. The display device 814 may include a display screen that is a built-in component of the computing device 800. The display device 814 may also include a computer monitor, television, or projector, among others, that is externally connected to the computing device 800. In addition, a network interface controller (NIC) 816 may be adapted to connect the computing device 800 through the system interconnect 806 to the network 818. In some embodiments, the NIC 816 can transmit data using any suitable interface or protocol, such as the internet small computer system interface, among others. The network 818 may be a cellular network, a radio network, a wide area network (WAN), a local area network (LAN), or the Internet, among others. An external computing device 820 may connect to the computing device 800 through the network 818. In some examples, external computing device 820 may be an external webserver 820. In some examples, external computing device 820 may be a cloud computing node.

The processor 802 may also be linked through the system interconnect 806 to a storage device 822 that can include a hard drive, an optical drive, a USB flash drive, an array of drives, or any combinations thereof. In some examples, the storage device may include a receiver module 824, a fact scorer module 826, a thesis scorer module 828, and a final score generator module 830. In some examples, one or more of the modules 824-830 may be implemented in an application or a convolutional neural network. The receiver module 824 can receive a plurality of object aspects of an object to be evaluated using a process, a structure of the process, a plurality of extracted facts from documents, a tree related to the plurality of object aspects and the structure, and a thesis for each leaf in the tree. In some examples, the theses may include a base thesis and a complex thesis. For example, a base thesis may correspond to a leaf in the tree and a complex thesis may correspond to an internal node in the tree. In some examples, the process may be a due diligence process and the object may be a company. In some examples, the extracted facts may have been extracted from a plurality of documents using any suitable information retrieval process. In some examples, each document may be split into sentences and a relatedness score computed between each sentence and each thesis. For example, sentences may be extracted having a relatedness score above a threshold score as the facts for each thesis. The fact scorer module 826 can relate the extracted facts to the theses in the tree. The fact scorer module 826 can then generate a score and a summary for each leaf corresponding to a fact in the tree. For example, each internal node in a tree may represent an aspect. A parent node may be a higher-level aspect and a child node may be a lower-level aspect, as demonstrated in FIG. 2 above. The lowest-level aspects may be parents of theses. The theses may be parents of facts. The facts may be leaves of the tree. The thesis scorer module 828 can generate a thesis score and a thesis summary for each thesis based on the scores of related facts for each thesis. In some examples, a thesis score for at least one of the theses is to be generated based on a thesis score of at least one child thesis connected to the thesis. For example, the thesis scores for a complex thesis may be based on one or more child theses connected to the complex thesis. In some examples, the final score generator module 830 can generate a final score for the object based on the thesis scores. In some examples, the final score generator module 830 may be a neural network. For example, the processor can train a classification model of final score generator module 830 to output the final score. In some examples, the classification model can be trained using a flat input comprising a vector of the thesis scores. In some examples, the processor is to train a neural network comprising the structure. For example, the trained neural network, or final score generator module 830, may receive a textual representation of the theses and merge the thesis scores based on the textual representation to generate the final score. In some examples, the processor can train a classification model including a recursive neural network trained to process dynamic theses generated per object. For example, the final score generator module 830 may be a recursive neural network.

It is to be understood that the block diagram of FIG. 8 is not intended to indicate that the computing device 800 is to include all of the components shown in FIG. 8. Rather, the computing device 800 can include fewer or additional components not illustrated in FIG. 8 (e.g., additional memory components, embedded controllers, modules, additional network interfaces, etc.). Furthermore, any of the functionalities of the receiver module 824, the fact scorer module 826, the thesis scorer module 828, and the final score generator module 830, may be partially, or entirely, implemented in hardware and/or in the processor 802. For example, the functionality may be implemented with an application specific integrated circuit, logic implemented in an embedded controller, or in logic implemented in the processor 802, among others. In some embodiments, the functionalities of the receiver module 824, the fact scorer module 826, the thesis scorer module 828, and the final score generator module 830, can be implemented with logic, wherein the logic, as referred to herein, can include any suitable hardware (e.g., a processor, among others), software (e.g., an application, among others), firmware, or any suitable combination of hardware, software, and firmware. In some examples, as described above, the functionalities of the receiver module 824, the fact scorer module 826, the thesis scorer module 828, and the final score generator module 830 may be implemented in a trained neural network. For example, the trained neural network may be a convolutional neural network.

Figure 9:
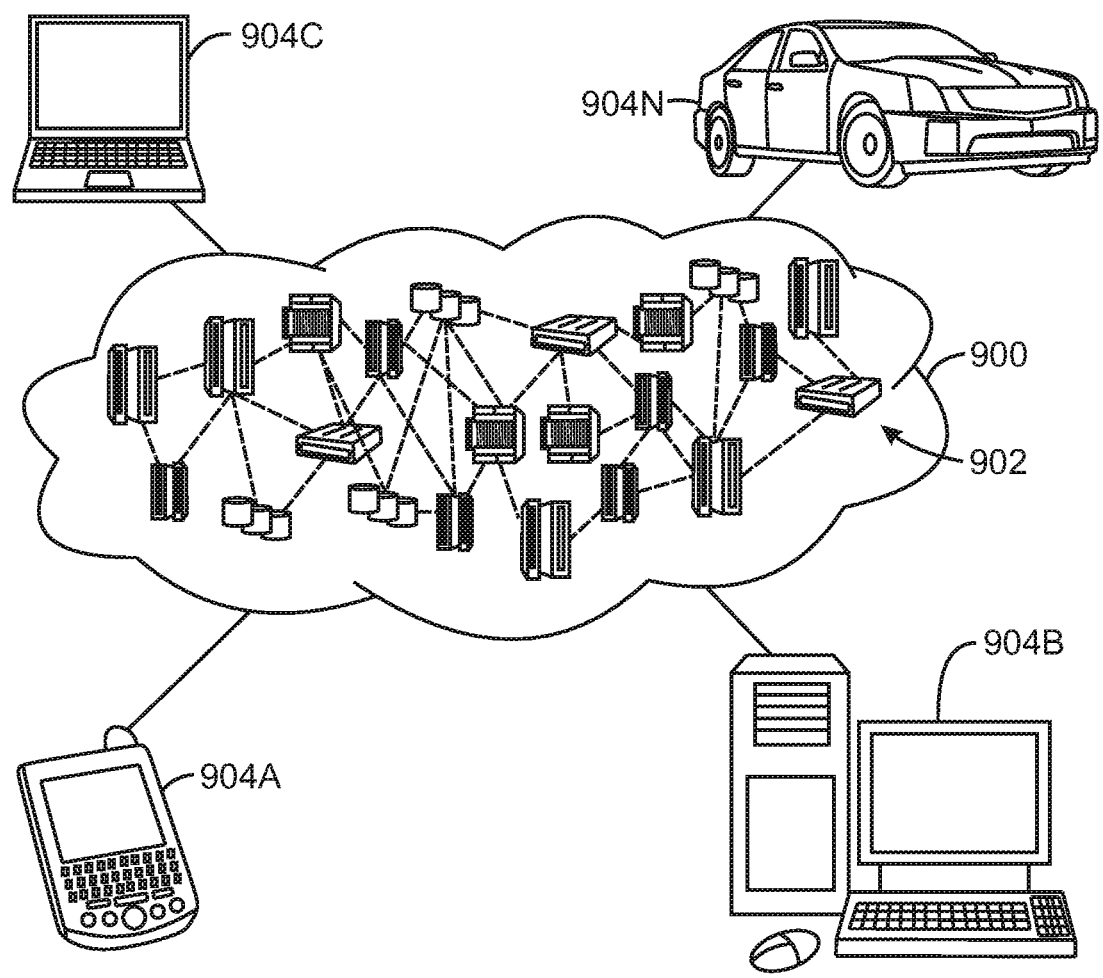
FIG. 9 is a block diagram of an example cloud computing environment according to embodiments described herein.

Referring now to FIG. 9, an illustrative cloud computing environment 900 is depicted. As shown, cloud computing environment 900 comprises one or more cloud computing nodes 902 with which local computing devices used by cloud consumers, such as, for example, personal digital assistant (PDA) or cellular telephone 904A, desktop computer 904B, laptop computer 904C, and/or automobile computer system 904N may communicate. Nodes 902 may communicate with one another. They may be grouped (not shown) physically or virtually, in one or more networks, such as Private, Community, Public, or Hybrid clouds as described hereinabove, or a combination thereof. This allows cloud computing environment 900 to offer infrastructure, platforms and/or software as services for which a cloud consumer does not need to maintain resources on a local computing device. It is understood that the types of computing devices 904A-N shown in FIG. 9 are intended to be illustrative only and that computing nodes 902 and cloud computing environment 900 can communicate with any type of computerized device over any type of network and/or network addressable connection (e.g., using a web browser).

Figure 10:
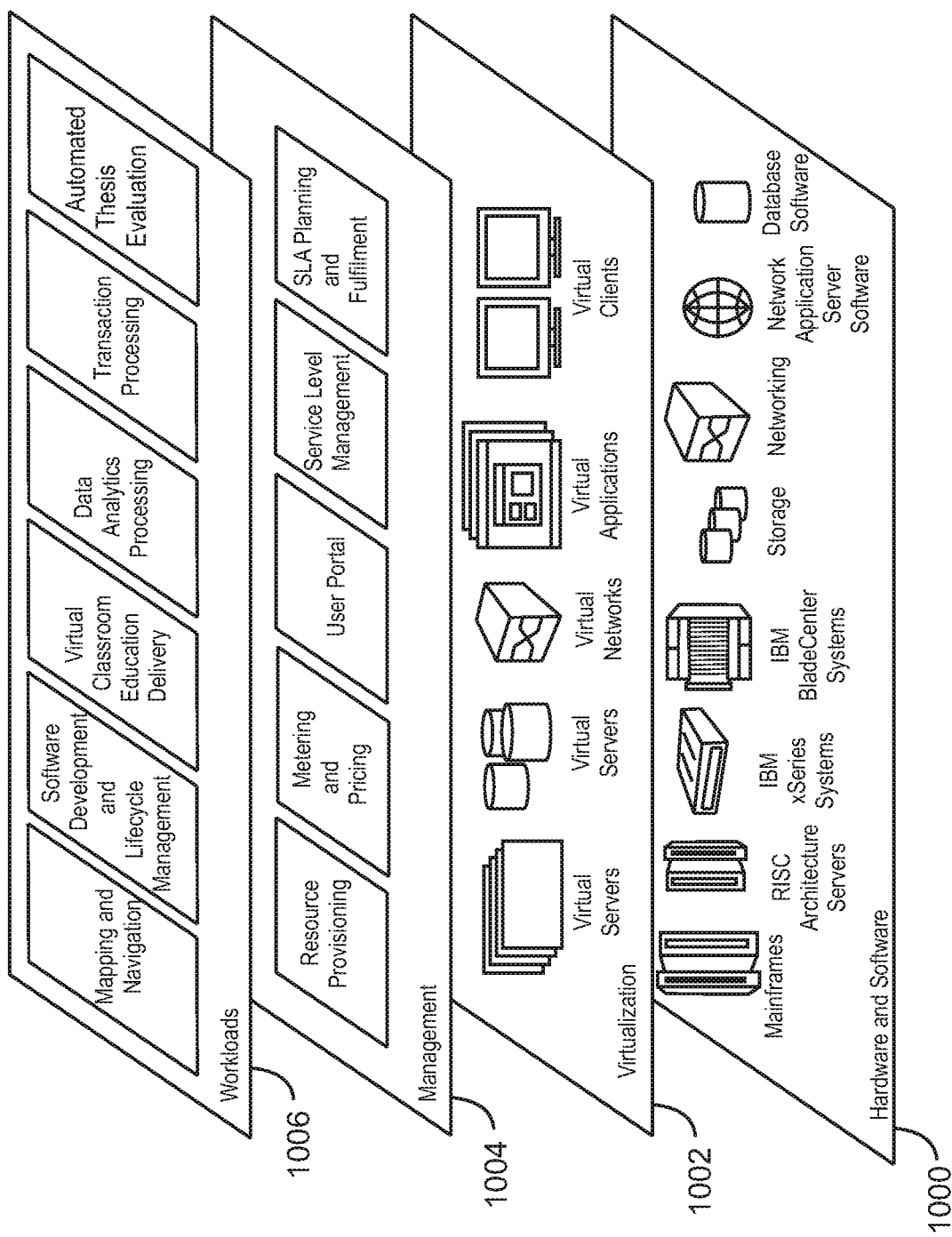
FIG. 10 is an example abstraction model layers according to embodiments described herein.

Referring now to FIG. 10, a set of functional abstraction layers provided by cloud computing environment 900 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1000 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1002 provides an abstraction layer from which the following examples of virtual entities may be provided: virtual servers; virtual storage; virtual networks, including virtual private networks; virtual applications and operating systems; and virtual clients. In one example, management layer 1004 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1006 provides examples of functionality for which the cloud computing environment may be utilized. Examples of workloads and functions which may be provided from this layer include: mapping and navigation; software development and lifecycle management; virtual classroom education delivery; data analytics processing; transaction processing; and automated thesis evaluation.

The present techniques may be a system, a method or computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present techniques may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present techniques.

Aspects of the present techniques are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 11:
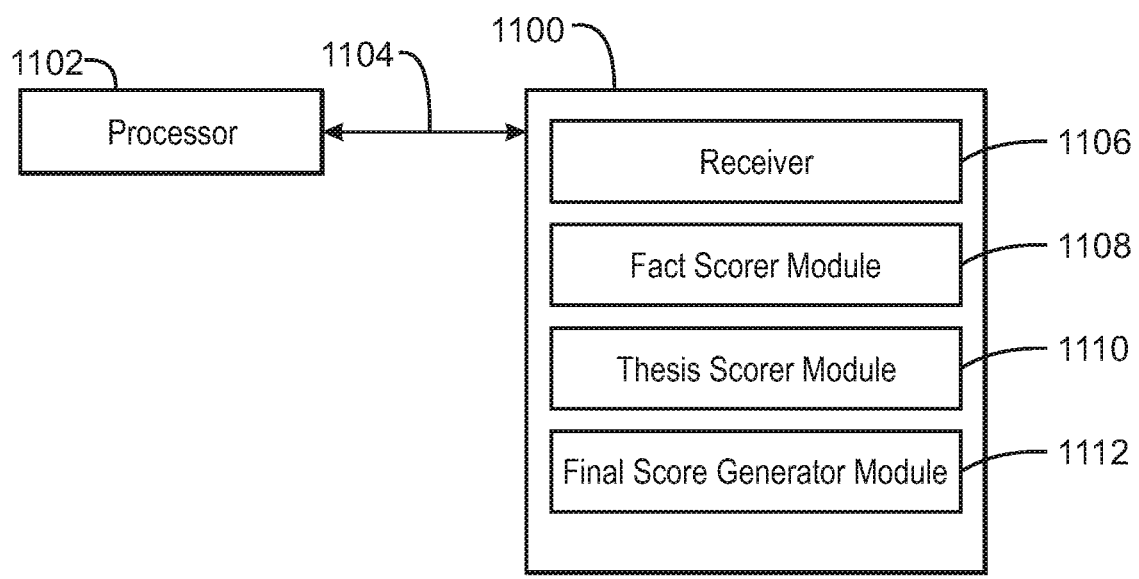
FIG. 11 is an example tangible, non-transitory computer-readable medium that can analyze theses using a tree structure.

Referring now to FIG. 11, a block diagram is depicted of an example tangible, non-transitory computer-readable medium 1100 that can analyze theses using a tree structure. The tangible, non-transitory, computer-readable medium 1100 may be accessed by a processor 1102 over a computer interconnect 1104. Furthermore, the tangible, non-transitory, computer-readable medium 1100 may include code to direct the processor 1102 to perform the operations of the method 700 of FIG. 7 above.

The various software components discussed herein may be stored on the tangible, non-transitory, computer-readable medium 1100, as indicated in FIG. 11. For example, a receiver module 1106 includes code to receive a plurality of object aspects of an object to be evaluated using a process, a structure of the process, a plurality of extracted facts from documents, a tree related to the plurality of object aspects and the structure, and a thesis for each leaf in the tree. For example, the object may be a company and the process may be a due diligence process. For example, the tree may include the object aspects and one or more structures from the process. In some examples, each of the plurality of documents may be split into sentences and a relatedness score calculated between each of the sentences and each of the theses. In some examples, sentences with relatedness scores above a threshold score may have been extracted as facts for each of the theses. A fact scorer module 1108 includes code to relate the extracted facts to the theses in the tree. The fact scorer module 1114 also includes code to generate a score and summary for each leaf corresponding to a fact in the tree. In some examples, the fact scorer module 1114 includes code to calculate a polarity for each of the related facts of each of the theses. For example, the polarity may be positive for supporting facts and negative for contradicting facts. A thesis scorer module 1116 includes code to generate a thesis score and a thesis summary for each thesis based on the scores and summaries of the related facts for each thesis. In some examples, the thesis scorer module 1116 includes code to recursively generate thesis scores based on child thesis scores generated for child theses of each thesis. For example, the thesis scorer module 1116 may include code to generate thesis scores and thesis summaries for each level of the tree beginning with a lower thesis level. In some examples, thesis scorer module 1116 includes may include code to train a neural network to generate confidence scores for each of the theses. In some examples, thesis scorer module 1116 may include code to train a classification model comprising a recursive neural network trained to process dynamic theses generated per object. In some examples, the thesis scorer module 1116 may also include code to calculate a weight for a thesis based on a dot product of an attention vector and a thesis representation. A final score generator module 1118 includes code to generate a final score for the object based on the thesis scores. In some examples, the score generator module 1118 can include code to train a neural network to generate the final score. In some examples, the final score generator module 1118 includes code to generate a final summary. FIG. 11 may be included within the tangible, non-transitory, computer-readable medium 1100, depending on the particular application.

The flowchart and block diagrams in the Figures illustrate the architecture, functionality, and operation of possible implementations of systems, methods, and computer program products according to various embodiments of the present techniques. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor to:
   receive a plurality of object aspects of an object, a root thesis comprising a prediction about the object to be evaluated, a tree related to the plurality of object aspects, and a thesis for each leaf in the tree, wherein each thesis is related to the root thesis;
   receive a plurality of extracted facts from a plurality of documents in response to receiving the plurality of documents from an information retrieval process, split each document into sentences, and compute a relatedness score between each sentence and each thesis, wherein sentences comprising a relatedness score above a threshold score are to be extracted as the extracted facts for each thesis;
   relate the extracted facts to the theses in the tree, wherein each internal node in the tree represents an aspect with internal nodes representing higher-level aspects connected as parents to internal nodes representing lower-level aspects, wherein the internal nodes representing lowest-level aspects are parents of theses, and wherein the nodes representing theses are parents to the leaves representing the facts;
   generate a score and a summary for each leaf corresponding to a fact in the tree;
   generate a thesis score and a thesis summary for each thesis based on the scores and the summaries of related facts for each thesis; and generate a final score for the root thesis about the object based on the thesis scores.

2. The system of claim 1, wherein the theses comprise a base thesis corresponding to a leaf in the tree and a complex thesis corresponding to an internal node in the tree.

3. The system of claim 1, wherein the thesis score for at least one of the theses is to be generated based on a thesis score of at least one child thesis connected to the thesis.

4. The system of claim 1, wherein the processor is to train a classification model comprising a recursive neural network trained to process dynamic theses generated per object.

5. The system of claim 1, wherein the tree comprises a plurality of nodes representing the object aspects and one or more leaves connected to each node, wherein the leaves represent facts.

6. The system of claim 1, wherein the process comprises a due diligence process and the object comprises a company.

7. A computer-implemented method, comprising:
   receiving, via a processor, a plurality of object aspects of an object, a root thesis comprising a prediction about the object to be evaluated using a process, a structure of the process, a tree related to the plurality of object aspects and the structure, and a thesis for each leaf in the tree, wherein each thesis is related to the root thesis;
   receive a plurality of extracted facts from a plurality of documents in response to receiving the plurality of documents from an information retrieval process, split each document into sentences, and compute a relatedness score between each sentence and each thesis, wherein sentences comprising a relatedness score above a threshold score are to be extracted as the extracted facts for each thesis;
   relating, via the processor, the extracted facts to the theses in the tree, wherein each internal node in the tree represents an aspect with internal nodes representing higher-level aspects connected as parents to internal nodes representing lower-level aspects, wherein the internal nodes representing lowest-level aspects are parents of theses, and wherein the nodes representing theses are parents to the leaves representing the facts;
   generating, via the processor, a score and a summary for each leaf corresponding to a fact in the tree;
   generating, via the processor, a thesis score and a thesis summary for each thesis based on the scores and the summaries of related facts for each thesis;
   generating, via the processor, a final score for the object based on the thesis scores.

8. The computer-implemented method of claim 7, wherein generating the thesis score and the thesis summary is performed recursively beginning at leaves of the tree.

9. The computer-implemented method of claim 7, wherein generating the thesis score and the thesis summary is based on a thesis score and a thesis summary of a child thesis.

10. The computer-implemented method of claim 7, wherein generating the thesis score comprises generating a vector representation.

11. The computer-implemented method of claim 7, wherein generating the thesis score comprises generating a scalar score.

12. The computer-implemented method of claim 7, wherein generating the final score comprises calculating a weight for a thesis based on a dot product of an attention vector and a thesis representation.

13. A computer program product for analyzing theses, the computer program product comprising a computer-readable storage medium having program code embodied therewith, wherein the computer readable storage medium is not a transitory signal per se, the program code executable by a processor to cause the processor to:

receive a plurality of object aspects of an object, a root thesis comprising a prediction about the object to be evaluated using a process, a structure of the process, and a plurality of extracted facts from documents, a tree related to the plurality of object aspects and the structure, and a thesis for each leaf in the tree;

receive a plurality of extracted facts from a plurality of documents in response to receiving the plurality of documents from an information retrieval process, split each document into sentences, and compute a relatedness score between each sentence and each thesis, wherein sentences comprising a relatedness score above a threshold score are to be extracted as the extracted facts for each thesis;

relate the extracted facts to the theses in the tree, wherein each internal node in the tree represents an aspect with internal nodes representing higher-level aspects connected as parents to internal nodes representing lower-level aspects, wherein the internal nodes representing lowest-level aspects are parents of theses, and wherein the nodes representing theses are parents to the leaves representing the facts;

generate a score and a summary for each leaf corresponding to a fact in the tree;

generate a thesis score and a thesis summary for each thesis based on the scores and the summaries of the related facts for each thesis; and generate a final score for the object based on the thesis scores.

14. The computer program product of claim 13, comprising program code executable by the processor to recursively generate thesis scores based on child thesis scores generated for child theses of each thesis.

15. The computer program product of claim 13, comprising program code executable by the processor to calculate a weight for a thesis based on a dot product of an attention vector and a thesis representation.

16. The computer program product of claim 13, comprising program code executable by the processor to train a neural network to generate confidence scores for each of the theses.

17. The computer program product of claim 13, comprising program code executable by the processor to generate thesis scores and thesis summaries for each level of the tree beginning with a lower thesis level.

* * * * *